(12) United States Patent
Posselt et al.

(10) Patent No.: US 7,481,202 B2
(45) Date of Patent: Jan. 27, 2009

(54) PROCEDURE TO OPERATE A FUEL SYSTEM OF AN INTERNAL COMBUSTION ENGINE

(75) Inventors: Andreas Posselt, Muehlacker (DE); Marko Lorenz, Grossbottwar (DE); Marcel Matischok, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/823,663

(22) Filed: Jun. 28, 2007

(65) Prior Publication Data

US 2008/0004786 A1    Jan. 3, 2008

(30) Foreign Application Priority Data

Jun. 28, 2006    (DE) .................. 10 2006 029 633

(51) Int. Cl.
*F02M 37/04* (2006.01)
(52) U.S. Cl. .................. 123/497; 123/198 DB
(58) Field of Classification Search .................. 123/497, 123/179.17, 198 D, 198 DB; 701/29, 45, 701/62
See application file for complete search history.

(56) References Cited

U.S. PATENT DOCUMENTS

| | | | | |
|---|---|---|---|---|
| 5,291,578 A * | 3/1994 | Kalami | .................. | 388/831 |
| 5,513,614 A * | 5/1996 | Gras et al. | .................. | 123/497 |
| 5,777,285 A * | 7/1998 | Frank et al. | .................. | 200/61.5 |
| 5,825,098 A * | 10/1998 | Darby et al. | .................. | 307/10.1 |
| 6,640,174 B2 * | 10/2003 | Schondorf et al. | .................. | 701/45 |
| 7,055,640 B2 * | 6/2006 | Cook | .................. | 180/284 |
| 7,086,493 B2 * | 8/2006 | Knight | .................. | 180/274 |
| 7,347,177 B2 * | 3/2008 | Tippy et al. | .................. | 123/198 DB |
| 7,377,253 B2 * | 5/2008 | Washeleski et al. | .................. | 123/198 D |
| 2002/0103590 A1 * | 8/2002 | Schondorf et al. | .................. | 701/45 |

* cited by examiner

*Primary Examiner*—Thomas N Moulis
(74) *Attorney, Agent, or Firm*—Merchant & Gould P.C.

(57) ABSTRACT

In the operation of a fuel system of an internal combustion engine, the fuel is compressed by a fuel pump and travels by way of at least one fuel injection device into at least one combustion chamber of the internal combustion engine. It is proposed that at least periodically during a phase immediately when starting or just after starting the internal combustion engine, the fuel pump is actuated corresponding to an increased set point pressure. An increase in the set point pressure, however, is blocked if at least one blocking condition is met.

19 Claims, 4 Drawing Sheets

PROCEDURE TO OPERATE A FUEL SYSTEM OF AN INTERNAL COMBUSTION ENGINE

STATE OF THE ART

The invention concerns a procedure to operate the fuel system of an internal combustion engine according to the preamble of claim 1. The subject matter of the invention is furthermore a computer program, an electrical storage medium, as well as an open-loop or closed-loop control device.

Fuel systems for internal combustion engines with intake-manifold fuel injection as well as with direct fuel injection are known from the market. In the case of fuel systems for internal combustion engines with intake-manifold fuel injection, provision is made for the most part for a fuel pump and a fuel filter, which are integrated in a module installed in the fuel tank. Fuel lines lead from there to a fuel allocation pipe and to fuel injection valves, respectively fuel injection jets, through which the fuel travels to the intake manifold and subsequently into the combustion chambers of the internal combustion engine. A pressure regulator is used between the fuel pump and the fuel injection valves in pressure regulated systems. The pressure regulator maintains a constant pressure in this region and directs excess fuel back to the fuel tank. In systems, where a closed-loop control is required, the fuel pump in contrast is operated with a variable output and with variable pressure. The invention at hand proceeds from a fuel system, where a closed-loop control is required.

DISCLOSURE OF THE INVENTION

Technical Task

The invention at hand has the task of pointing out a procedure to operate a fuel system, whose application lowers the toxic emissions of the internal combustion engine and lengthens the life of the components of the fuel system.

Technical Solution

The task is solved by means of a procedure with the characteristics of claim 1. Advantageous modifications are indicated in the dependent claims. The task is also solved by way of the subject matters of the associated patent claims. Beyond these, significant characteristics for the invention are found in the following description and in the drawing. Characteristics can thereby also be significant for the invention in very different combinations, which are not explicitly referred to at the appropriate points of the application.

Advantageous Effects

The diameter of the droplets of fuel, which are injected by the fuel injection device, is reduced by the actuation of the fuel pump corresponding to an increased set point pressure, which leads to an improved fuel-mixture generation in the combustion chamber of the internal combustion engine and consequently to lower emissions. This is particularly important when starting or just after starting the internal combustion engine because the catalytic converter assembly cannot yet yield its full effectiveness in such a phase. An increase in the set point pressure is, however, not permitted in each case according to the invention, but can be blocked contingent upon at least one blocking condition. In so doing, the unnecessary increase in the set point pressure is prevented. Thus, damage to one of the component parts of the fuel system or at least a reduction of the life of one such component by an increase in the set point pressure is likewise prevented.

Such a blocking condition is then, for example, met if a degree to which a catalytic converter of the internal combustion engine is heated up achieves at least a threshold state. By a threshold state, such a state is understood to exist, in which the catalytic converter can generate a desired emission control effect on the exhaust gas. Most importantly an unnecessary increase in the set point pressure is thus avoided as a result of this step according to the invention, because if the catalytic converter can yield a sufficient emission control performance, the increase in the set point pressure, which reduces emissions but at the same time stresses the fuel system, is not required.

The blocking condition can also thereby be met, when the set point pressure has already been raised at least once within the present operating cycle. In so doing, the total number of cases, in which the set point pressure can be raised, is reduced. This once again reduces the stress on the fuel system and thus lengthens its service life.

The blocking condition can additionally be met if a variable, which characterizes an actual temperature of the fuel system, especially that of the fuel pump or a fuel filter, achieves or exceeds a threshold value. Underlying the above statement is the awareness that, for example, if the fuel system or one of its components is already stressed by a high temperature, an additional stress due to an increase in pressure should be avoided. This is the case in order to avoid an overstressing of the fuel system, respectively of one of its components, or at least an early deterioration of the system (component part protection).

That blocking condition can serve as a fall-back position, which is then met if a time, which has elapsed since starting the internal combustion engine, achieves or exceeds a threshold value.

A blocking condition, which has been met, also exists if a release of the air bag was requested in a motor vehicle, in which the fuel system is installed. This is normally only the case when such a motor vehicle is involved in an accident. The safety of the passengers of such a motor vehicle is improved, in that an increase in the set point pressure and in so doing also in the actual pressure in the fuel system is blocked.

It is also proposed that a blocking condition exists if at least one certain error was detected in the fuel system. Such an error can, for example, be a leakage in the fuel system, a clogged filter, an error of the pressure regulator, a defective pressure sensor, etc. In this way, the operational safety of the fuel system is improved.

It is particularly advantageous if the increased set point pressure is dependent on a set point output rate and an actual supply voltage of the fuel pump. This dependency can, for example, be predefined by a characteristic diagram. Both influencing factors, which are then the set point output and the actual supply voltage, limit the pressure, which actually can be supplied by the fuel pump. In this modification of the procedure according to the invention, a request for an increased set point pressure, which can under no circumstances be supplied by the fuel pump, is avoided.

It is furthermore proposed that the normal set point pressure be a function of a rotational speed of a crankshaft of the internal combustion engine and of a relative filling of the cylinder(s) with air, and that the increased set point pressure be a function of a variable, which characterizes an actual fuel temperature. The normal set point pressure is therefore a function of the load, whereby an unnecessary high set point pressure is avoided. An increased set point temperature is, however, simultaneously supplied, which is all the more higher, the higher the fuel temperature is. This is particularly pertinent to systems with a large heat input. The thought underlying this modification is that harmful vapor bubbles are more likely to arise in fuel lines between the fuel pump and the injection valve when the lines are subjected to a higher rather than lower fuel pressure. By way of an increase in the set point pressure, such vapor bubbles are reduced or avoided. The pressure increase described here is only than admissible if the previously defined blocking condition to protect the component parts is not met. The reliability of the fuel system is thus improved by this modification of the procedure according to the invention.

BRIEF DESCRIPTION OF THE DRAWINGS

A particularly preferred example of embodiment of the invention at hand is explained in detail below with reference to the accompanying drawing. In the drawing, the following are shown.

FORMS OF EMBODIMENT OF THE INVENTION

Figure 1:
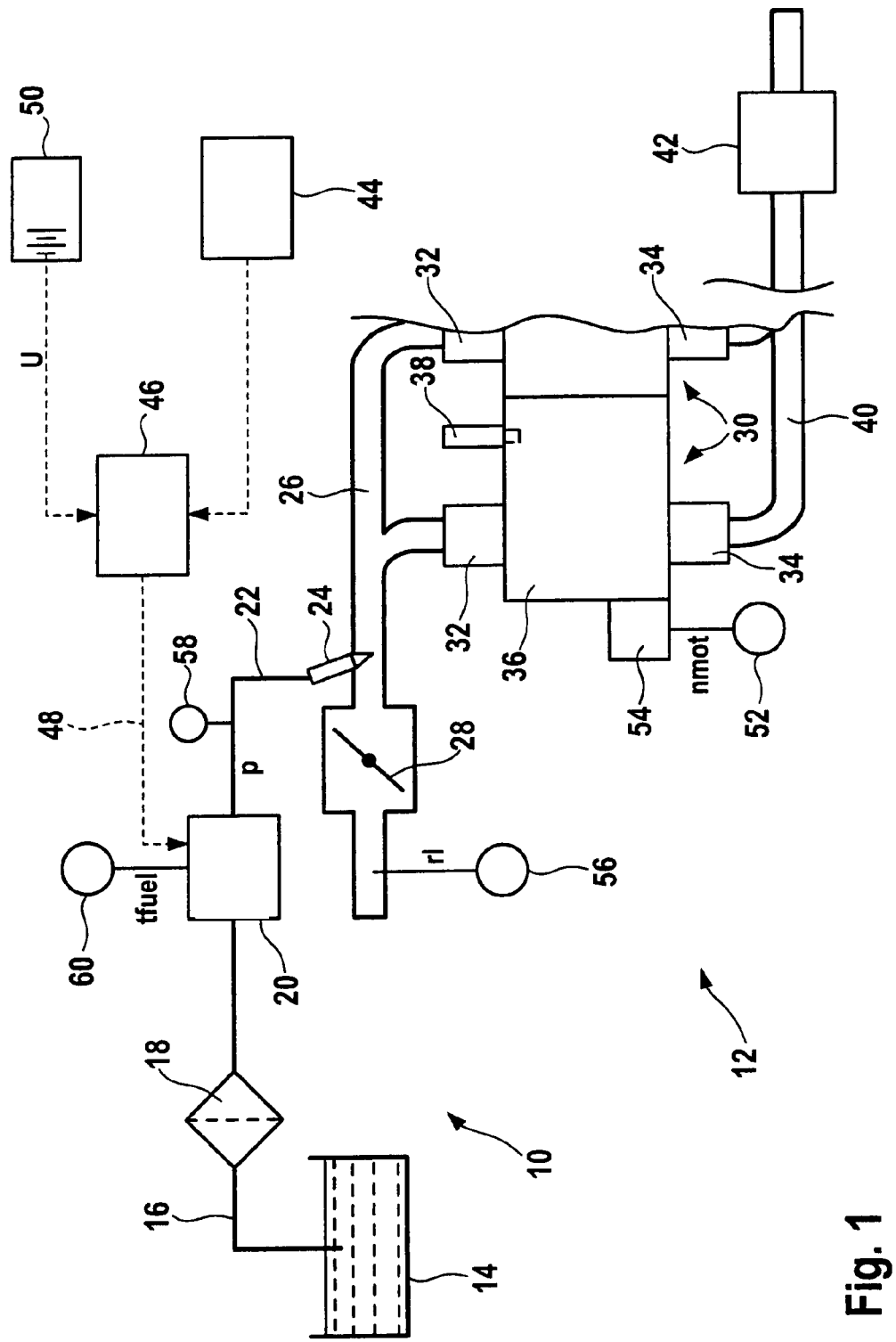
FIG. 1 a schematic diagram of a fuel system of an internal combustion engine.

A fuel system bears as a whole the reference number 10 in FIG. 1. It serves to supply an internal combustion engine, which in FIG. 1 is entirely referred to with the number 12.

The fuel system 10 comprises a fuel tank 14, from which a line 16 leads across a filter 18 to a fuel pump 20 (The fuel pump 20 can also be integrated into the fuel tank 14, and the filter 18 can be connected in after the fuel pump 20.) The fuel pump 20 is driven electrically. A line 22 leads from the fuel pump 20 to an injection valve 24.

The injection valve 24 sprays the fuel into the intake manifold 26 and in fact downstream from a throttle valve 28. The intake manifold 26 leads to the individual cylinders 30 of the internal combustion engine 12, which is equipped with intake valves 32 and exhaust valves 34. A fuel-air-mixture located in a combustion chamber 36 of a cylinder 30 is ignited by a spark plug 38. An exhaust gas pipe 40 leads from the exhaust valves 34 to a catalytic converter assembly 42.

The operation of the fuel system 10 is controlled in an open- and closed-loop by a control device 44. This device actuates among other things a final stage 46, which in turn actuates the fuel pump 20 by means of a pulse width modulated signal 48. A supply voltage u required for the operation of the fuel pump 20 is provided by a battery 50.

The open- and closed-loop control device 44 receives signals from different sensors. A crankshaft sensor 52 is intended for this purpose, which acquires an actual rotational speed nmot of a crankshaft 54 of the internal combustion engine 12. A HFM sensor 56 is furthermore intended for this purpose, from whose signal an actual filling of air r1 into the combustion chambers 36 of the internal combustion engine 12 is ascertained. The pressure p in the line 22 between the fuel pump 20 and the fuel injection valve 24 is acquired by a pressure sensor 58. Finally a temperature sensor 60 allows for the ascertainment of an actual temperature rfuel of the fuel pump 20, respectively the fuel. This sensor is depicted in FIG. 1 at the fuel pump 20. It could, however, also be located on the internal combustion engine 12; or it could be combined with the pressure sensor 58, and the actual temperature of the fuel pump 20 could then be ascertained by means of a suitable numerical model from the temperature of the internal combustion engine 12.

In the normal operation of the fuel system 10 and the internal combustion engine 12, the fuel from the fuel pump 20 is compressed to a normal pressure and sprayed into the intake manifold 26 by way of the fuel injection valve 24. The fuel-air-mixture, which is generated in this manner, proceeds across the intake manifold 26 and the intake valves 32 into the combustion chambers 36 and is combusted there. The exhaust gases arising during the combustion are purified by the catalytic converter assembly 42.

The catalytic converter assembly 42 requires a certain operating temperature for this purpose. The emission control effect of the catalytic converter assembly 42 is correspondingly slight beneath this operating temperature. After an initial starting of the internal combustion engine 12, the catalytic converter assembly 42 does not at first have its normal operating temperature. For this reason, the fuel pump 20 can be actuated corresponding to an increased set point temperature during a phase immediately after the starting of the internal combustion engine 12. In this way, a finer atomization of the fuel from the fuel injection valve 24 results; and the average diameter of the fuel droplets is smaller. This allows for a better fuel-mixture generation in the combustion chambers 36, which in turn reduces the emissions in the exhaust gas upstream from the catalytic converter assembly 42. In so doing, a certain minimum quality for the exhaust gas is then also achieved when the catalytic converter assembly 42 can not yet yield its maximum performance.

Figure 2:
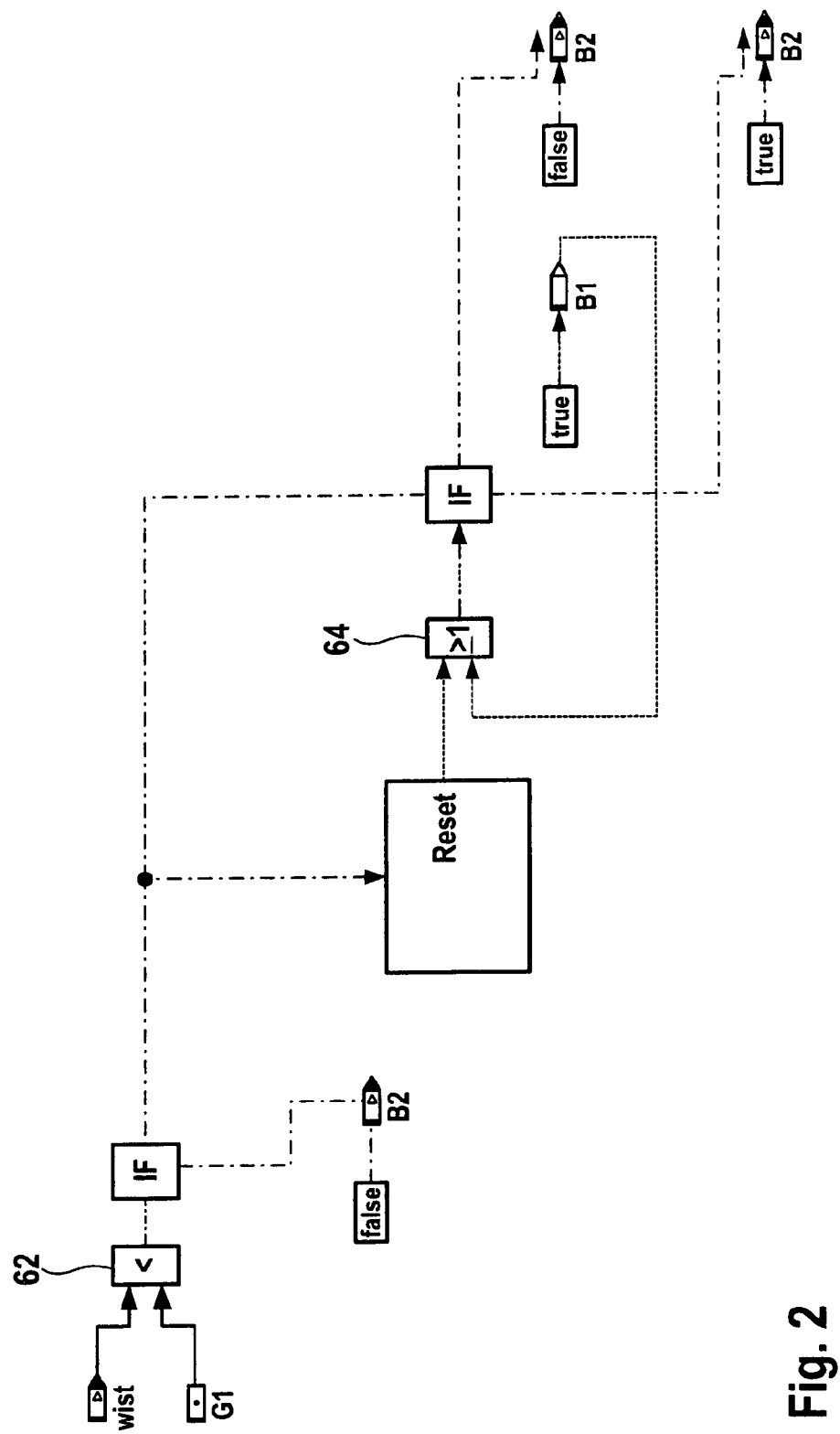
FIG. 2 a block diagram of a first region of a procedure to operate the fuel system of FIG. 1.

This increase in the set point pressure is, however, not permitted in every case with regard to the fuel system but is blocked if at least one blocking condition is met. This is now explained while referring to FIGS. 2 and 3. In FIG. 2 the progress of heating up the catalytic converter assembly 42 is expressed by the variable wist. The variable wist is compared in 62 with a threshold value G1. If wist achieves the threshold value G1, it is assumed that the catalytic converter assembly 42 is heated to an extent, whereby the exhaust gas can be controlled in the desired manner. If this is the case, a bit B2 switches to the condition "false", otherwise it has the condition "true". In the latter case, the fuel pump 20 is actuated corresponding to the increased set point pressure. In the former case, such an increase in the set point pressure is blocked. As is evident from FIG. 2, a test is made in 64 to see if the bit B2 and a bit B1 have the condition "true", respectively the value 1. The bit B1 only then has the condition "true" if the set point pressure has not already once been increased within the existing operating cycle of the internal combustion engine 12, respectively the fuel system 10. If the result of the query in 62 is "true", the bit B2 receives likewise the value "true", so that the fuel pump 20 is actuated correspondingly to an increased set point pressure. Otherwise the bit B2 receives the condition "false".

It is therefore evident from FIG. 2 that an increase in the set point pressure is blocked if a blocking condition is met. This blocking condition exists, if the degree wist, to which the catalytic converter assembly 42 is heated up, has at least achieved the threshold state G1 or if the set point pressure has already been increased at least once within the existing operating cycle. Additional such blocking conditions are evident from FIG. 3.

Figure 3:
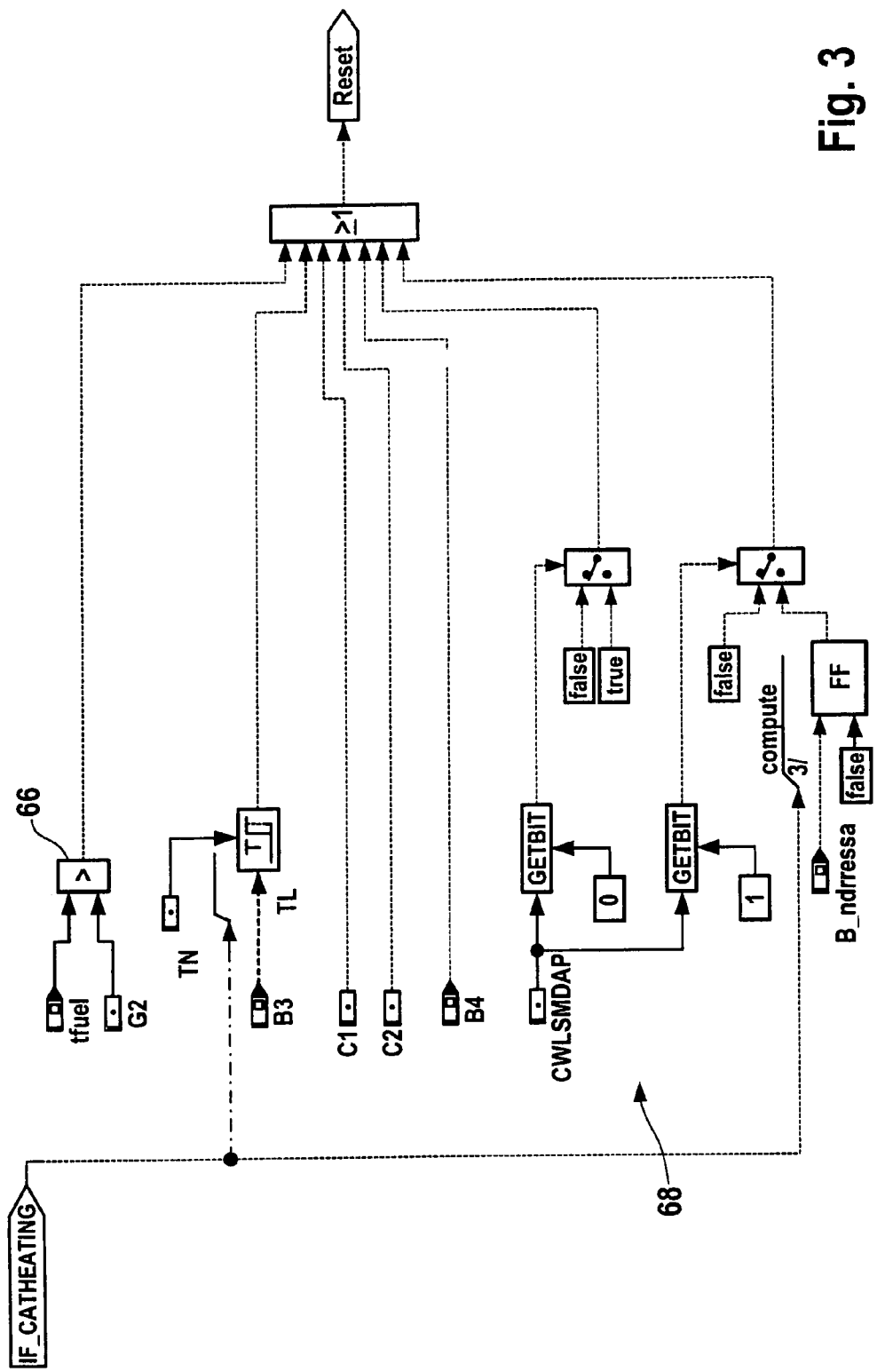
FIG. 3 a block diagram of a second region of a procedure to operate the fuel system of FIG. 1.

In FIG. 3 an actual temperature for the fuel pump 20 is designated with the annotation tfuel, as it, for example, is acquired by the temperature sensor 60. An actual temperature could also, for example, be alternatively acquired for the fuel filter. It is only important that it concerns a temperature, which characterizes a thermal state of the fuel system 10, respectively of one of its components. This temperature tfuel is compared in 66 with a threshold value G2. As soon as the temperature tfuel achieves the threshold value G2, the blocking condition is met; and thus an increase in the set point pressure is blocked.

As soon as the immediate starting action of the internal combustion engine is completed, a bit B3 is set, whereby an elapsed-time meter TN is started. As soon as this time meter TN achieves a threshold TL, the blocking condition mentioned above is likewise met.

The same is true for the case that a bit B4 is set, which stands for a request to release the air bag, provided that the internal combustion engine 12 with the fuel system 10 is installed in a motor vehicle with such a feature.

Furthermore the said blocking condition is met, if conditions C1 or C2 are met, which represent system errors in the fuel system 10. The condition C1, for example, is met if the pressure sensor 58 malfunctions; the condition C2 is then met if the closed-loop control of the lower pressure system malfunctions. A region 68 in FIG. 3 contains functions, which allow the user to test the functionality of the request for an increased set point temperature.

Figure 4:
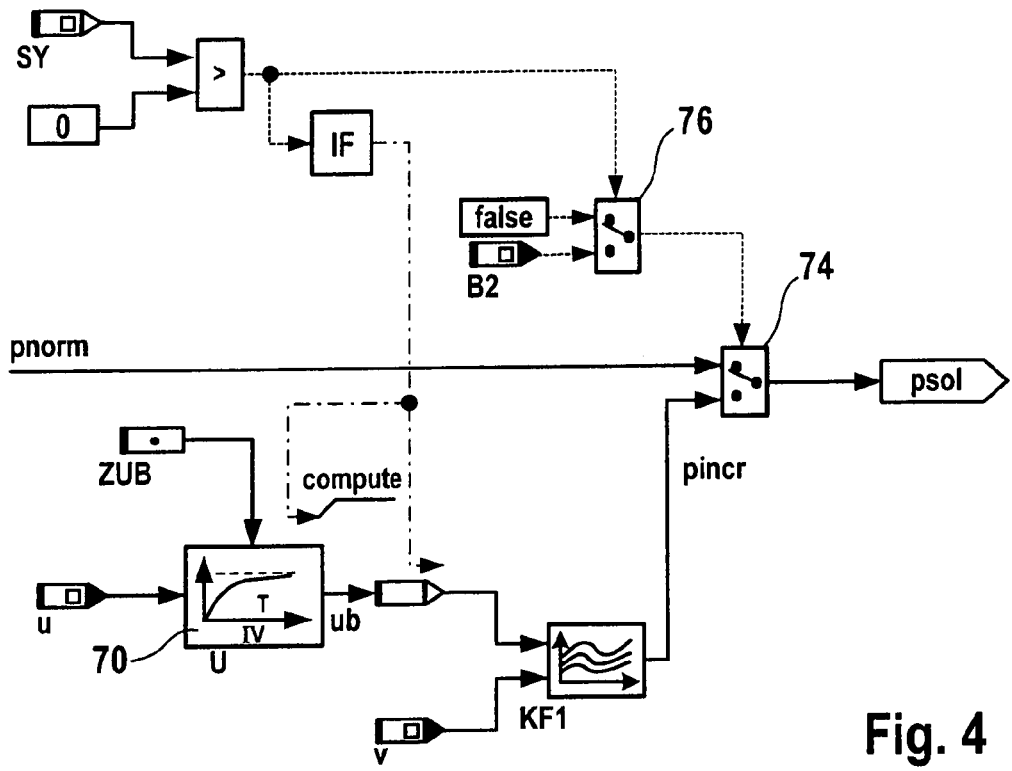
FIG. 4 a block diagram of a third region of a procedure to operate the fuel system FIG. 1.

FIG. 4 shows that the increased set point pressure depends on a set point output rate v and an actual supply voltage u of the fuel pump. The supply voltage u is provided by the battery 50. The increased set point pressure is designated in FIG. 4 with "pincr". It is evident that the supply voltage u is fed into a filter 70, in which irregularities in the signal acquisition are suppose to be smoothed out. The output of the filter 70 is fed together with the set point output rate v into a characteristic diagram KF1, which emits the increased set point pressure pincr. Depending on the position of the switch 74, either the increased set point pressure pincr or the normal set point pressure pnorm is used as the set point pressure psol. The position of the switch in turn depends on the bit B2, corresponding to the position of a switch 76.

Figure 5:
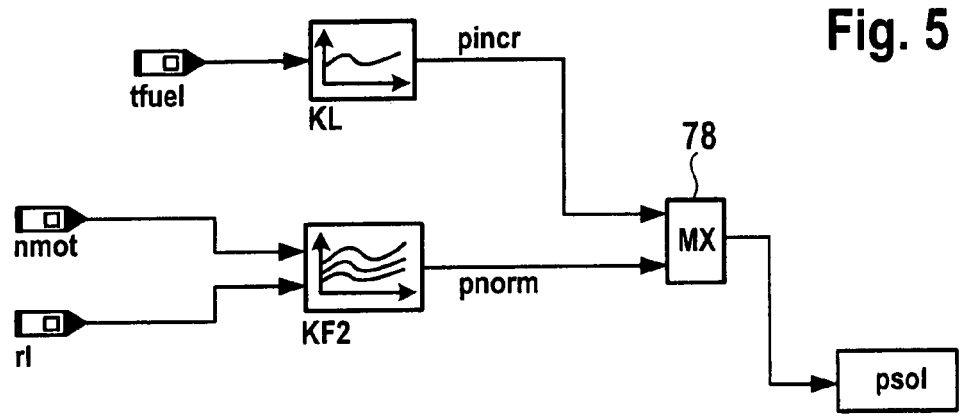
FIG. 5 a block diagram of a fourth region of a procedure to operate the fuel system of FIG. 1.

FIG. 5 shows that the normal set point pressure pnorm can be a function of the rotational speed nmot of the crankshaft 54 of the internal combustion engine 12 and a function of the relative filling of the cylinder(s) with air r1. For this purpose, these two variables are supplied to a characteristic diagram KF2. The increased set point pressure pincr is a function of the actual fuel temperature tfuel. This temperature tfuel, however, must inevitably concern the same value tfuel, which was determined above. The connection between tfuel and pincr is established by the characteristic curve KL; and in fact in such a way that the increased set point pressure pincr is increased more dramatically at a higher fuel temperature tfuel than at a lower fuel temperature tfuel. The greater of the two values pincr and pnorm is used in 78.

The invention claimed is:

1. A method of operating a fuel system of an internal combustion engine in which fuel is compressed by a fuel pump and flows through at least one fuel injection device into at least one combustion chamber of the internal combustion engine, the method comprising:
    actuating the fuel pump, at least periodically during a phase immediately when starting or just after starting the internal combustion engine, corresponding to an increased set point pressure; and
    blocking an increase to the set point pressure if at least one blocking condition is met, wherein the blocking condition is met if a degree to which a catalytic converter assembly of the internal combustion engine is heated up at least achieves a threshold state.

2. A method according to claim 1, wherein the blocking condition is met if the set point pressure has already at least once been increased within an existing operating cycle.

3. A method according to claim 1, wherein the blocking condition is met if an actual temperature of the fuel system, especially of the fuel pump or of a fuel filter, achieves or exceeds a threshold value.

4. A method according to claim 1, wherein the blocking condition is met if a time, which has elapsed since starting the internal combustion engine achieves or exceeds a threshold value.

5. A method according to claim 1, wherein the blocking condition is met if a release of the air bag is requested in a motor vehicle in which the fuel system is installed.

6. A method according to claim 1, wherein the blocking condition is met if at least one certain error is detected in the fuel system.

7. A method according to claim 1, wherein the increased set point pressure is a function of a set point output rate and an actual supply voltage of the fuel pump.

8. A method according to claim 1, wherein a normal set point pressure is a function of a rotational speed of a crankshaft of the internal combustion engine and of a relative filling of a cylinder with air; and wherein the increased set point pressure is dependent on an actual fuel temperature in such a way that the set point is more dramatically increased at a higher fuel temperature than at a lower fuel temperature.

9. A computer-readable storage medium encoding a computer program of instructions for executing a computer process for operating a fuel system of an internal combustion engine in which fuel is compressed by a fuel pump and flows through at least one fuel injection device into at least one combustion chamber of the internal combustion engine, said computer process comprising:
    actuating the fuel pump, at least periodically during a phase immediately when starting or just after starting the internal combustion engine, corresponding to an increased set point pressure; and
    blocking an increase to the set point pressure if at least one blocking condition is met, wherein the blocking condition is met if the set point pressure has already at least once been increased within an existing operating cycle.

10. An electrical storage medium for an open-loop or closed-loop control device of a fuel system of an internal combustion engine, the electrical storage medium including instructions for:
    actuating a fuel pump of the fuel system, at least periodically during a phase immediately when starting or just after starting the internal combustion engine, corresponding to an increased set point pressure; and
    blocking an increase to the set point pressure if at least one blocking condition is met, wherein the blocking condition is met if an actual temperature of the fuel system, including the fuel pump or of a fuel filter, achieves or exceeds a threshold value.

11. An open-loop and/or closed-loop control device for a fuel system of an internal combustion engine, wherein the control device actuates the fuel pump, at least periodically during a phase immediately when starting or just after starting the internal combustion engine, corresponding to an increased set point pressure; and blocks an increase to the set point pressure if at least one blocking condition is met, wherein the increased set point pressure is a function of a set point output rate and an actual supply voltage of the fuel pump.

12. The computer readable storage medium according to claim 9, wherein the blocking condition is met if a degree to which a catalytic converter assembly of the internal combustion engine is heated up at least achieves a threshold state.

13. The computer readable storage medium according to claim 9, wherein the blocking condition is met if an actual temperature of the fuel system, especially of the fuel pump or of a fuel filter, achieves or exceeds a threshold value.

14. The computer readable storage medium according to claim 9, wherein the blocking condition is met if a time, which has elapsed since starting the internal combustion engine, achieves or exceeds a threshold value.

15. The electrical storage medium according to claim 10, wherein the blocking condition is met if a release of the air bag is requested in a motor vehicle in which the fuel system is installed.

16. The electrical storage medium according to claim 10, wherein the blocking condition is met if at least one certain error is detected in the fuel system.

17. The electrical storage medium according to claim 10, wherein the increased set point pressure is a function of a set point output rate and an actual supply voltage of the fuel pump.

18. The open-loop and/or closed-loop control device according to claim 11, wherein the blocking condition is met if a degree to which a catalytic converter assembly of the internal combustion engine is heated up at least achieves a threshold state.

19. The open-loop and/or closed-loop control device according to claim 11, wherein a normal set point pressure is a function of a rotational speed of a crankshaft of the internal combustion engine and of a relative filling of a cylinder with air; and wherein the increased set point pressure is dependent on an actual fuel temperature in such a way that the set point is more dramatically increased at a higher fuel temperature than at a lower fuel temperature.

\* \* \* \* \*